United States Patent
Kannan

(10) Patent No.: US 8,438,595 B1
(45) Date of Patent: May 7, 2013

(54) METHOD AND APPARATUS FOR TEMPORAL CORRELATION OF CONTENT-SPECIFIC METADATA WITH CONTENT OBTAINED FROM DISPARATE SOURCES

(75) Inventor: Navneeth N. Kannan, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 11 days.

(21) Appl. No.: 13/289,505

(22) Filed: Nov. 4, 2011

(51) Int. Cl.
*H04N 7/10* (2006.01)
*H04N 7/025* (2006.01)

(52) U.S. Cl.
USPC .......................................................... 725/32

(58) Field of Classification Search ................ 725/32–36
See application file for complete search history.

(56) References Cited

U.S. PATENT DOCUMENTS

| | | | |
|---|---|---|---|
| 5,703,877 | A | 12/1997 | Nuber et al. |
| 5,765,164 | A | 6/1998 | Prasad et al. |
| 7,227,971 | B2 | 6/2007 | Nagao |
| 7,536,027 | B2 | 5/2009 | Nagao |
| 7,801,910 | B2 | 9/2010 | Houh et al. |
| 7,889,964 | B1 | 2/2011 | Barton et al. |
| 8,055,688 | B2 | 11/2011 | Giblin |
| 2007/0280301 | A1 | 12/2007 | Yamanaka |
| 2007/0286577 | A1 | 12/2007 | Kato et al. |
| 2008/0007653 | A1 | 1/2008 | Mori et al. |
| 2008/0101456 | A1 | 5/2008 | Ridge et al. |
| 2009/0034784 | A1 | 2/2009 | McQuaide, Jr. |
| 2009/0150947 | A1 | 6/2009 | Soderstrom |
| 2009/0259633 | A1 | 10/2009 | Bronstein et al. |
| 2010/0082727 | A1 | 4/2010 | Zalewski |
| 2010/0083077 | A1 | 4/2010 | Paulsen et al. |
| 2010/0208856 | A1 | 8/2010 | Fuchikami et al. |
| 2011/0050995 | A1 | 3/2011 | Ozawa et al. |
| 2011/0145880 | A1 | 6/2011 | Wang |
| 2011/0246495 | A1 | 10/2011 | Mallinson |

FOREIGN PATENT DOCUMENTS

| | | |
|---|---|---|
| EP | 1162828 B1 | 12/2001 |
| EP | 1439700 A1 | 7/2004 |
| EP | 1447986 A1 | 8/2004 |
| WO | 2011123325 A1 | 10/2011 |

OTHER PUBLICATIONS

U.S. Appl. No. 13/212,214, filed Aug. 18, 2011.
U.S. Appl. No. 12/973,257, filed Dec. 20, 2010.
"ClipSync Launches New Viewing Parties Application for Facebook / Watch New Season of Big Brother 11 With Friends on Facebook" (press release), San Francisco, CA (PRWEB), available at <www.prweb.com/pdfdownload/2633224.pdf>, accessed Jan. 8, 2013, dated Jul. 13, 2009.

(Continued)

*Primary Examiner* — Dominic D Saltarelli
(74) *Attorney, Agent, or Firm* — Stewart M. Wiener

(57) ABSTRACT

A method of correlating content-specific metadata to a point of interest in primary video content includes generating a series of content-specific temporal markers spaced throughout the play time of the primary video content and receiving input of the content-specific metadata intended for temporary display at the point of interest during playback of the primary video content. The content-specific metadata and point of interest are associated with at least one of the content-specific temporal markers. Additional methods of temporarily displaying metadata and apparatus for correlating content-specific metadata to a point of interest in primary video content are described.

19 Claims, 5 Drawing Sheets

OTHER PUBLICATIONS

K. Monson, "Hands on With ClipSync", Appscout Blog, PC Magazine, available at <appscout.pcmag.com/none/277580-hands-on-with-clipsync>, accessed Jan. 8, 2013, dated Feb. 21, 2007.

Clipsync.com, Home Page, available at <web.archive.org/web/20100514085407/http://clipsync.com/>, accessed Jan. 8, 2013, dated May 14, 2010.

Clipsync.com, "Platform", available at <web.archive.org/web/20100512075952/http://clipsync.com/platform-2>, accessed Jan. 8, 2013, dated May 14, 2010.

Clipsync.com, "Social TV", available at <web.archive.org/web/20100515051235/http://clipsync.com/platform-2/social-tv>, accessed Jan. 8, 2013, dated May 14, 2010.

Clipsync.com, "Engaged Ads", available at <web.archive.org/web/20100512075957/http://clipsync.com/platform-2/engaged-ads>, accessed Jan. 8, 2013, dated May 14, 2010.

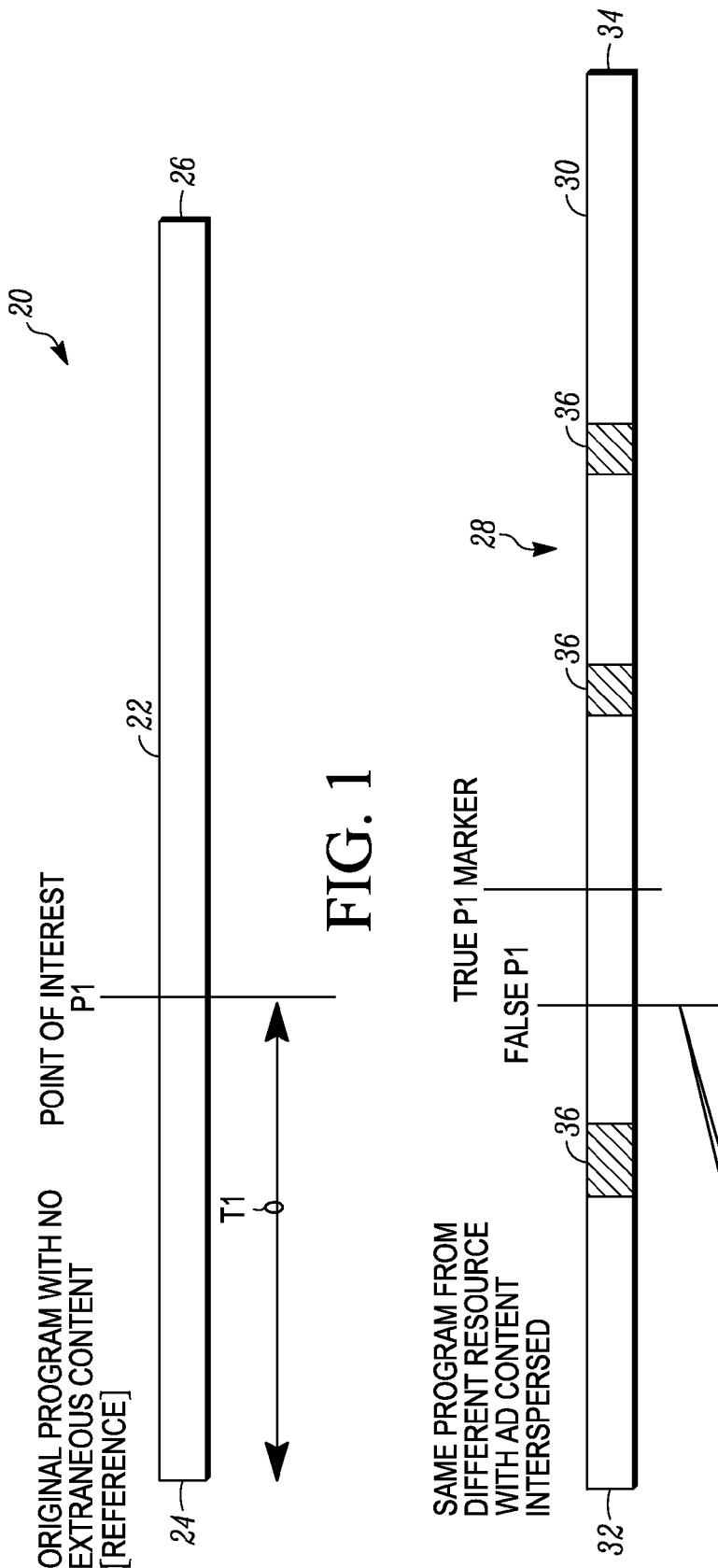

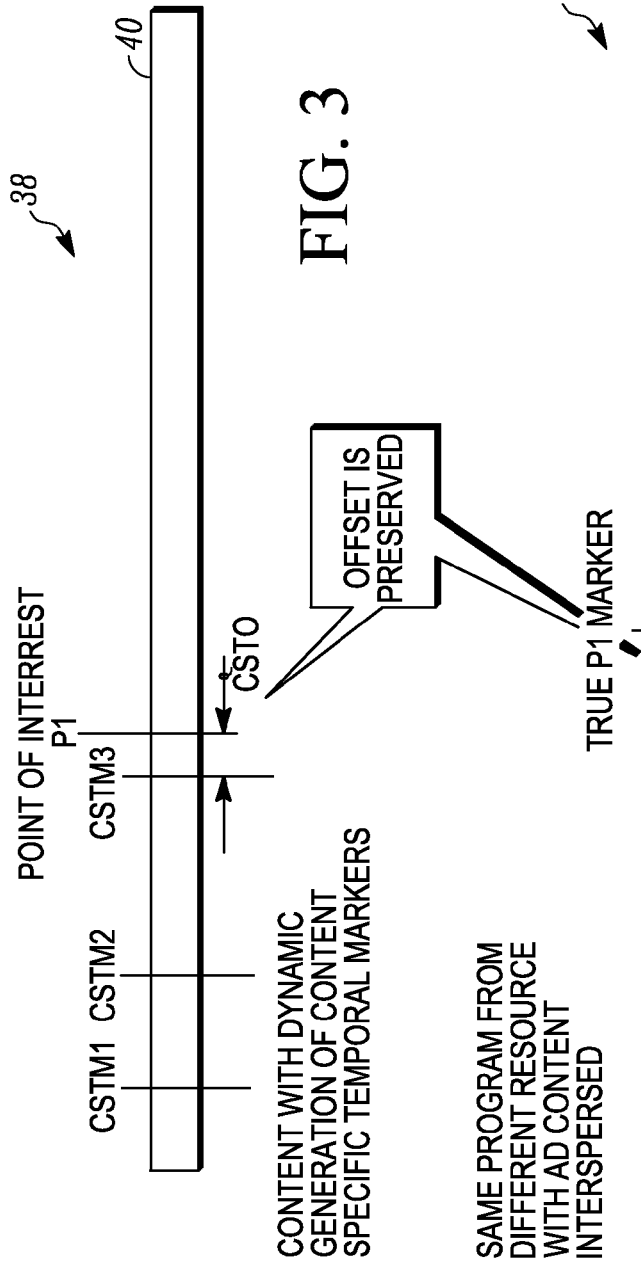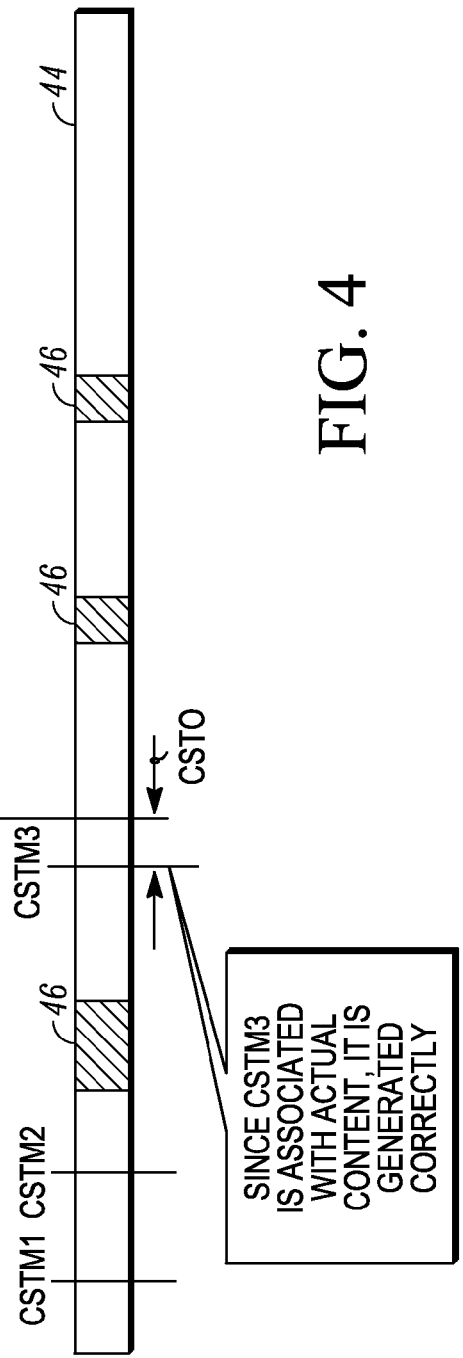

METHOD AND APPARATUS FOR TEMPORAL CORRELATION OF CONTENT-SPECIFIC METADATA WITH CONTENT OBTAINED FROM DISPARATE SOURCES

FIELD

Method and apparatus for correlating content-specific metadata with a point of interest in primary video content of a video program are described.

BACKGROUND

Interactive television (TV), social networking, and like services have given rise to traditional video consumers acting as social networking users. For instance, social networking users may share comments, ratings, bookmarks, tags, scene tags, frame tags, highlights, and many other forms of user-generated metadata with other viewers of the same primary video content, irrespective of the source from which the video program containing the primary video content is obtained. Here, the term "primary video content" does not include extraneous content of the video program that may have been spliced into the video stream, such as advertisements and the like. In contrast, the term "video program" refers to all content including the primary video content and the extraneous content.

Some user-generated information (i.e., comments, ratings, bookmarks, tags, etc.) may be relevant to the program content in its entirely, and thus, may not necessarily be associated with any given frame, scene, point in time, or point of interest of the primary video content. However, other types of user-generated metadata may have temporal relevance to a particular frame, scene, point in time, or point of interest of the primary video content. For instance, a content-specific comment made about a particular scene or a bookmark associated with a specific point in the primary video content may have temporal relevance with the content being viewed.

In some instances, user-generated metadata, such as, comments, ratings, bookmarks, tags and the like can be strictly associated and directly stored with the content in a one-to-one relationship. In this case, all such temporal tags are associated with timestamps utilizing the start of the program as a reference time. However, there are also instances and systems in which user-generated tags are not stored directly with the content. Rather, the video programs containing the primary video content may be obtained from various different sources, and the user-generated metadata, which is separately processed and stored, is added onto the content during playback.

Thus, user-generated tags or the like may be shared in the context of assets (i.e., primary video content) that are known to be the same content, but not necessarily provided from the same source in an identical manner. By way of example, a user may associate some tags with a video program when consumed from a first source which did not have any advertisements; however, when the same primary video content is later made available through a different source, for instance, this time with advertisements or other interspersed content, the program start and finish times may no longer provide a valid reference mechanism for use in proper temporal correlation of a user-generated tag with a specific frame, scene, point in time, or point of interest of the primary video content.

The above problem can exist at the time of tag creation and at a later time during tag display because there is no way of knowing where the tag should be placed within a video program or where it should be displayed without any reference point within the video program. Thus, unless the same asset is being referenced and the program start/finish times and media flow are identical, the program start or finish time cannot be used as a reference point from which to place the tag so that it is properly associated with a particular frame or scene of the primary video content.

In addition to the above described reason for misalignment of user-generated metadata relative to a point of interest within primary video content (i.e., the addition or change of advertisements or other interspersed content), another cause of temporal misalignment may be that the primary video content has been highly edited with scenes or parts thereof removed and/or added. Thus, one version of a program may have no temporal resemblance to the original program. In addition, DVR recordings of the same program may have portions edited and/or removed, and a program being recorded or a service that has been acquired may be from a point in time other than the original starting point (i.e., delayed recording or tune time). Highlight reels will also have no temporal resemblance to the original full-length primary video content.

Accordingly, a solution is needed to the above described temporal misalignment problem of user-generated tags or metadata with primary video content, particularly with respect to video programs that are provided from disparate sources and that may not be identical to the version which was viewed when user-generated metadata or tags were initially created.

SUMMARY

This disclosure describes a method of correlating content-specific metadata to a point of interest in primary video content of a video program. A series of content-specific temporal markers that are spaced throughout the play time of the primary video content is generated. Input of the content-specific metadata intended for temporary display at the point of interest during playback of the primary video content is received, and the content-specific metadata and point of interest are associated with at least one of the content-specific temporal markers.

This disclosure also describes a method in which a series of content-specific temporal markers are generated for primary video content of a video program received from a source and in which an item of content-specific metadata is received from a remote server apart from receiving the video program. Information of one of the series of content-specific temporal markers and an offset from the one of the series of content-specific temporal markers that associates the item of content-specific metadata to a point of interest within the primary video content is also received from the remote server. Display of the video program on a display screen is controlled such that the item of content-specific metadata is temporarily displayed at the point of interest of the primary video content.

This disclosure further describes a signal processing electronic device for correlating content-specific metadata to a point of interest in primary video content of a video program. The device includes a caption system module for generating a series of content-specific temporal markers for the primary video content based on caption information provided by a video stream providing the primary video content. The device also includes a processing unit having user application software for generating and temporarily displaying content-specific metadata relative to points of interest within the primary video content, and a collaborative media tag management library module for communicating with a remote server to access and store content-specific metadata apart from the video program and to access and store information of the points of interest associated with the content-specific metadata based on a specific one of the series of content-specific temporal markers and an offset therefrom.

BRIEF DESCRIPTION OF THE DRAWINGS

Various features of the embodiments described in the following detailed description can be more fully appreciated when considered with reference to the accompanying figures, wherein the same numbers refer to the same elements.

FIG. 1 is a time line representation relative to the playing of a video program having a program start time and finish and having a point-of-interest (P1) noted at a particular time during playback of the video program in accordance with an embodiment.

FIG. 2 is a time line representation of the video program shown in FIG. 1 with added content interspersed therein in accordance with an embodiment.

FIG. 3 is a time line representation of the video program shown in FIG. 1 with content-specific temporal markers (CSTMs) noted thereon in accordance with an embodiment.

FIG. 4 is a time line representation of the video program shown in FIG. 3 with added content interspersed therein in accordance with an embodiment.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 5:
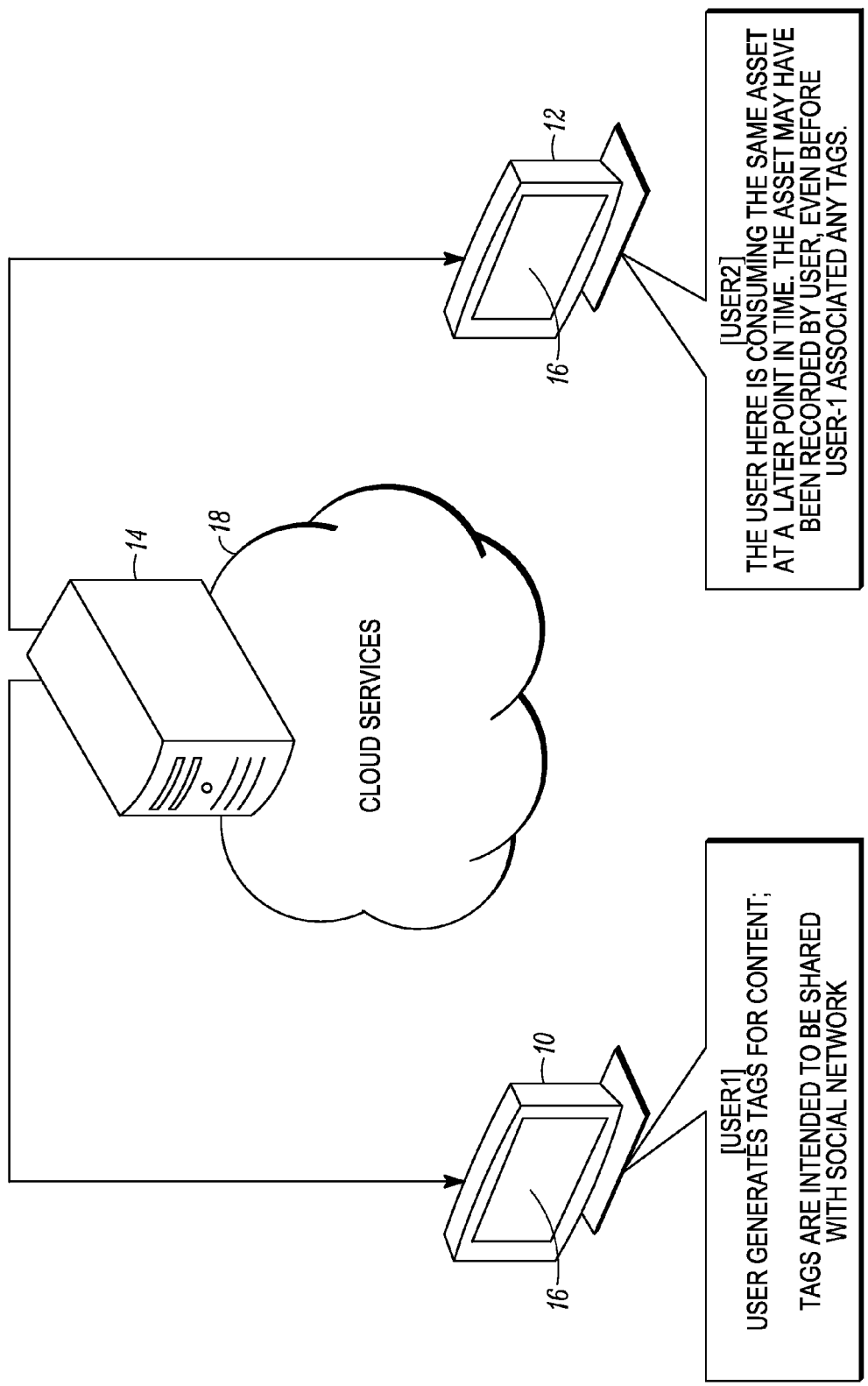
FIG. 5 is an example of a network including two user terminals and a server for use in viewing, storing, and sharing user-generated metadata with respect to video content in accordance with an embodiment.

As best shown in FIG. 5, a first user terminal 10 (USER 1) and a second user terminal 12 (USER 2) are each capable of connecting to a server 14 which together can form a part of a social network. The user terminals 10 and 12 may be provided in the forms of signal-processing electronic devices, set-top boxes, televisions, televisions with set-top-boxes, media centers, computers, laptop computers, tablet computers, smartphones and like devices. The user terminals 10 and 12 will typically include or be connected to a display screen 16 on which video can be displayed and viewed by the user. The user terminals 10 and 12 will also typically include an input mechanism (not shown) for entering comments, bookmarks, ratings, tags or like metadata by means of a keypad, remote controller, or the like.

In the example shown in FIG. 5, the server 14 can be referred to as a Collaborative Media Tag Management server (CMTM server) that is connected to a network 18 and that enables user-generated metadata such as tags, bookmarks, comments, ratings and the like to be stored and shared with other users relative to viewing primary video content of video programs, such as movies, television shows, and the like. The user terminals 10 and 12 and server 14 may be located at remote locations with respect to each other and may be interconnected by a service provider network or the like. For example, the service provider can be a cable television operator, Internet service provider, a multiple service operator (MSO) or the like.

In the arrangement shown in FIG. 5, primary video content contained in video programs available via the network 18 or other local or remote sources (i.e., a local recorded program) can be viewed by a user, such as USER 1, and USER 1 can enter and store on CMTM server 14 their comments or other metadata or tags relative to the primary video content. At a later time, a second user, such as USER 2, can view the primary video content or asset with the comments or tags generated by the USER 1. In this instance, the CMTM server 14 provides the tags or metadata stored by USER 1 to USER 2 for playback with the primary video content.

Specific-content metadata or tags are displayed only temporarily during playback of the primary video content. For instance, a comment on a particular scene of a movie may only be displayed during the scene. Thus, the comment does not remain displayed throughout the entire playback of the primary video content; rather, it is "put up" on the display screen at an appropriate time (i.e., at the beginning of a particular scene) and removed from the display screen at an appropriate time (i.e., at the end of a particular scene).

The primary video content viewed separately by USER-1 and USER-2 may be obtained from different sources and may not necessarily be identical for reasons previously discussed. For instance, one program may have advertisements spliced within the content stream and the other may not have advertisements or may have entirely different advertisements of different lengths and at different times in the program. Also, one program may be edited such that it is different from the other, or one program may have a different starting point.

In the above described scenarios, problems may arise in that the comments, tags or metadata generated by USER-1 may not appear at the correct time during playback of the primary video content viewed by USER-2. For example, a comment on one scene may be displayed during a different scene. Thus, the user-generated tags will be misaligned from a timing standpoint and may not properly correlate with the intended frame, scene, point in time, or point of interest of the primary video content. An example of such misalignment is provided by the illustrations in FIGS. 1 and 2.

In FIG. 1, an original program 20 of primary video content is represented by time bar or video stream 22 which has a definable program start time 24 and a program finish time 26. In the example shown in FIG. 1, the original program 20 and content stream is without extraneous content such as advertisements or the like. A point-of-interest (P1) where a user may want to add and display a comment, tag, bookmark, or the like is shown on the time bar 22 of FIG. 1. In this example, the point-of-interest (P1) is located a predetermined amount of elapsed time (T1) from the program start time 24. The elapsed time (T1) represents a length of time that can be measured and determined.

The same primary video content as provided by the program 20 in FIG. 1 may also be provided by a different program 28 represented in FIG. 2 by time bar or video stream 30. This time bar 30 has a definable program start time 32 and program finish time 34; however, it also includes periods of added content 36, such as advertisements interspersed within the primary video content. In a comparison of time bars 22 and 30, it is clear that time bar 30 is of greater running time due to the additional content 36 interspersed therein.

If the point-of-interest (P1) shown in FIG. 1 represents a point of time, frame or scene during the playing of the primary video content when a user-generated tag is to be displayed during playback of the program 28 of FIG. 2, the use of the elapsed time (T1) from the program start time 32 will not properly correlate the tag with the desired point in time of P1 in the primary video content. This is because an advertisement or other added content 36 has been added to program 28 within the elapsed time (T1). Thus, the use of the program start time 32 and the elapsed time (T1) on time bar 30 extends to "False P1" which does not represent nor associate the appropriate time during playback to display the user-generated tag. The correct time for associating and playing the user-generated tag is referenced in FIG. 2 as "True P1 Marker". Here, to obtain the desired temporal correlation of P1 in time bar 22 with True P1 Marker on time bar 30, the use of the program start time 32 and knowledge of the elapsed time (T1) is not useful.

The above problem exists at the time of creation of the tag and at a later time during display of the tag because there is no way of knowing in advance where the tag should be displayed within a program that is subject to change or how the tag should be saved without having any reference within the program. Thus, unless the same asset (i.e. video program) is being referenced, and the program start time and media flow are identical, the program start times, 24 and 32, cannot be used as a reference point from which to properly place the tag/metadata.

FIGS. 3 and 4 show a system for solving the problem discussed above with respect to FIGS. 1 and 2. In FIGS. 3 and 4, special markers in the primary video content that are inherently associated with the primary video content are generated. These markers are such that they have a temporal association with the primary video content and are spread throughout the running time of the primary video content. Thus, the markers provide multiple reference points throughout the running time or playback of the primary video content that can be used as dynamic reference points from which time offsets can be calculated reliably and used to associate user-generated tags with points-of-interest in the primary video content.

In one embodiment, the "Content-Specific Temporal Markers" (CSTMs) are generated in media where "Closed Caption data" is present within the content or video stream. Closed caption data is not based on arbitrary reference points such as a program start time. Rather, closed caption data has a strong association with the primary video content and provides information not only to uniquely identify a given marker, but also to associate time reference.

In FIG. 3, the same primary video content and point-of-interest (P1) as shown in FIGS. 1 and 2 is also represented in a video program 38 by time bar or video stream 40. However, in FIG. 3, the video program 38 includes content-specific temporal markers CSTM1, CSTM2 and CSTM 3 defined in time bar 40 corresponding to points of time in the primary video content and not necessarily the video program 38 itself. These markers CSTM1, CSTM2 and CSTM 3, for instance, can be generated from closed caption data provided with the video stream of the program. At these specific points in time during the running of the primary video content, a new caption may be caused to be displayed on the display with the video and may correspond to the spoken words or sounds currently being emitted by audio during playback of the video. Thus, the closed caption data is tied directly to certain times of the primary video content irrespective of advertisements, editing, and the like added to or deleted from the video program 38.

In FIG. 3, the point-of-interest (P1) occurs in the primary video content a short elapsed time after CSTM3. As discussed above, CSTM3 may refer to a point in time of the primary video content where a particular caption is added to or removed from the display. There is an offset of time between CSTM3 and P1 and this is referenced as a "Content-Specific Temporal Offset" (CSTO). The CSTO information is measurable and known and can be stored. Accordingly, via use of CSTM3 and CSTO, the temporal integrity of a user-generated tag at point-of-interest (P1) can be preserved.

The same primary video content as provided by the video program 38 in FIG. 3 may also be provided by a different video program 42 represented in FIG. 4 by time bar or video stream 44. Time bar 44 includes periods of added content 46, such as advertisements interspersed within the primary video content. Thus, program 42 is not identical to program 38 despite providing the same primary video content.

If the point-of-interest (P1) shown in FIG. 3 represents a point of time, frame or scene during the playing of the primary video content when a user-generated tag is to be displayed during playback of the program 42 of FIG. 4, the CSTM3 and CSTO can be used to correlate the tag with the desired point in time of P1 in the primary video content. This is because, although an advertisement or other added content 46 has been added to program 42 between CSTM2 and CSTM3, the marker CSTM3 is tied to the running time of the primary video content not the running time of the video program 42. For instance, at CSTM3, a specific word may be spoken by a character in the primary video content. From this marker, the offset, CSTO, can be applied to properly correlate the user-generated tag to "True P1 Marker" shown in FIG. 4.

In the above example, the original video program 38 shown in FIG. 3 is without spliced content. It should be understood that the use of CSTMs and CSTOs is equally applicable when the original video program 38 has extraneous content spliced into it or when the later viewed program does not.

Accordingly, as described above, the determination of offsets (CSTO) from content-specific temporal markers (CSTM) can be used to timestamp user-generated tags or like metadata or other tags or metadata not generated by a user. Closed captioning information provides one means for defining and generating the content-specific temporal markers (CSTMs). The above described process can be used for time correlation of assets thereby permitting user-generated and other tags to be associated with assets that may not be identical in all respects and that may be obtained from entirely different sources. One particular contemplated use of this process is to enhance multi-screen viewing experiences for an end subscriber in a social networking environment.

Figure 6:
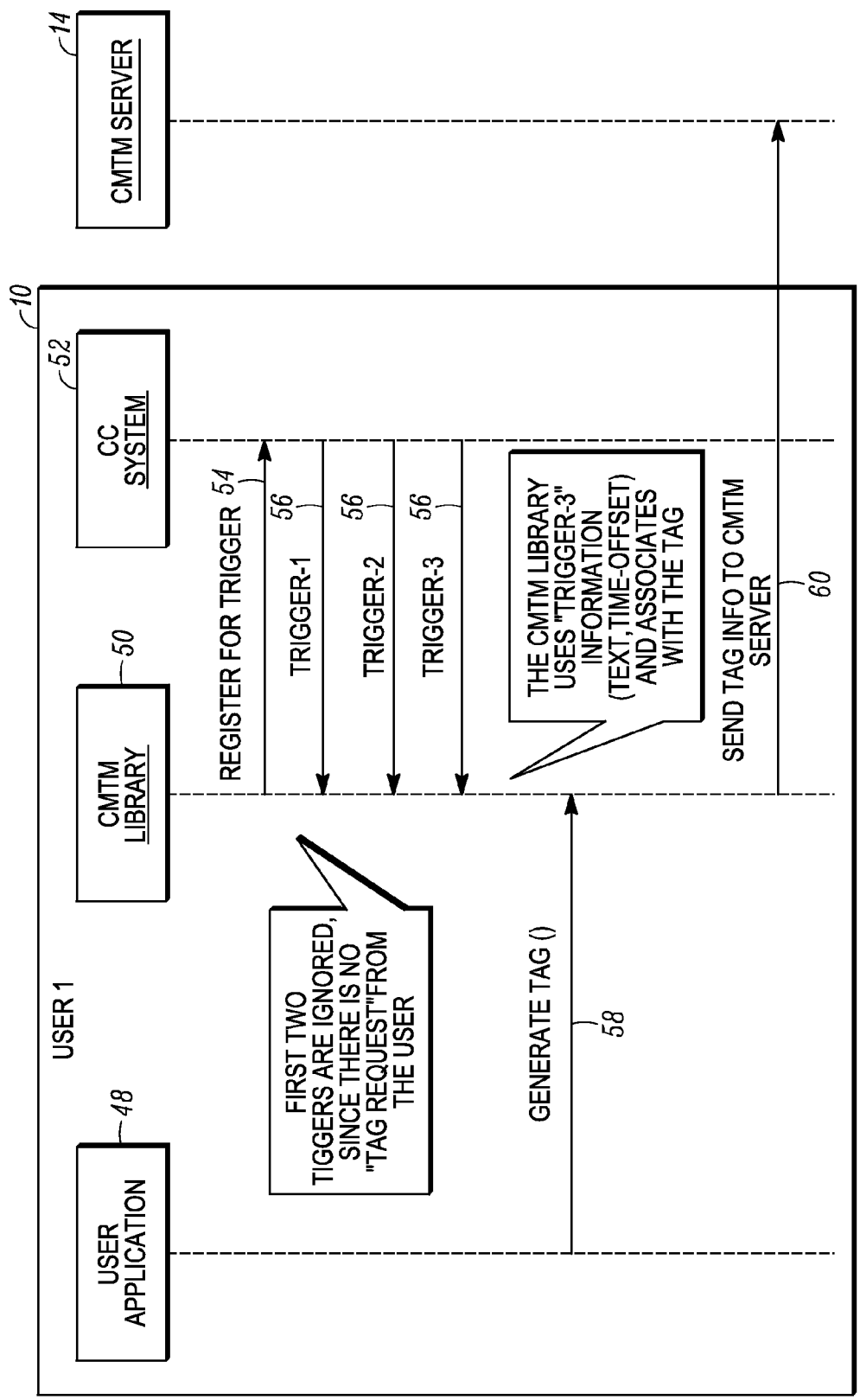
FIG. 6 is a schematic diagram showing exchanges of newly-generated metadata between the first user terminal and the server shown in FIG. 5 in accordance with an embodiment.
Figure 7:
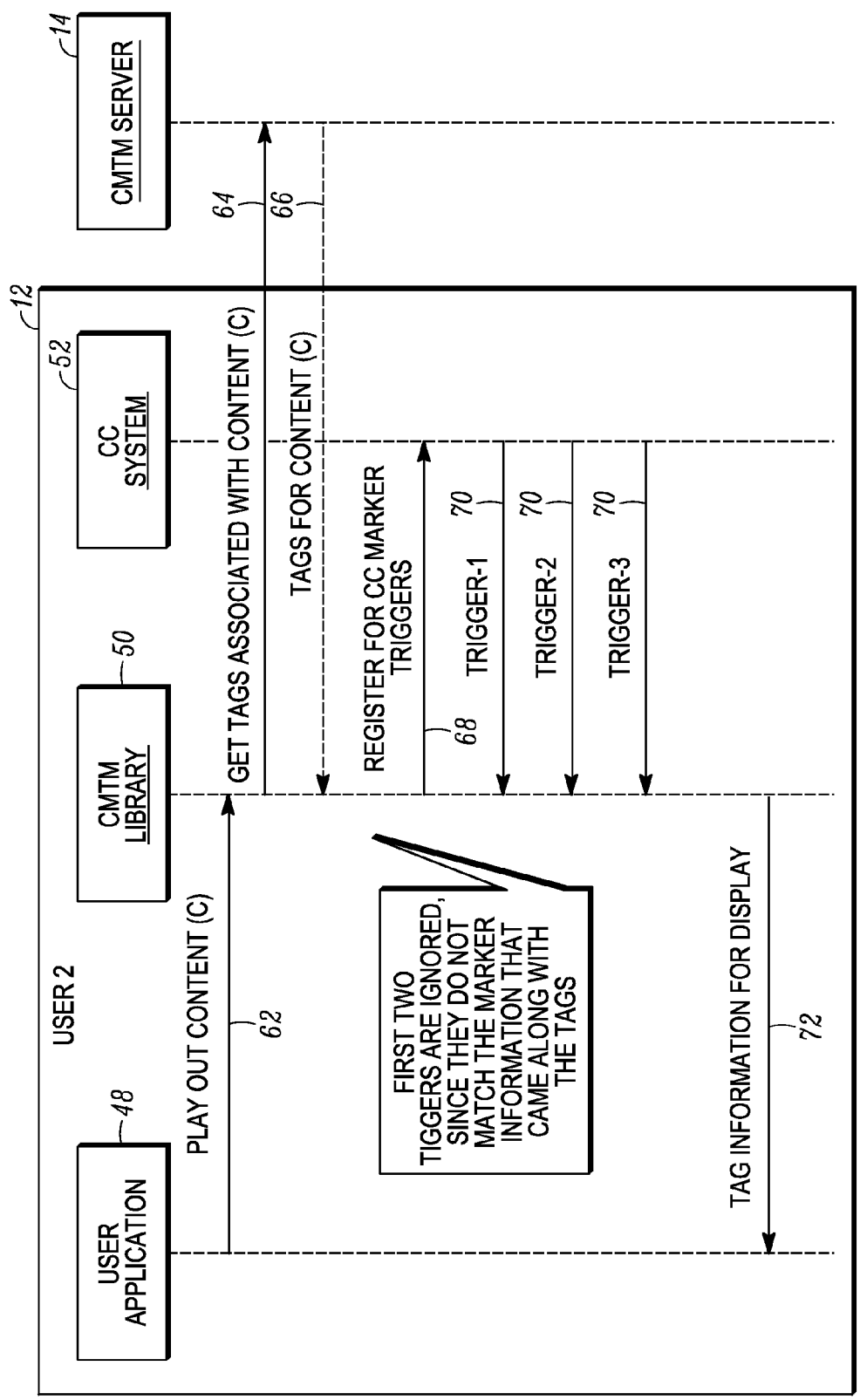
FIG. 7 is a schematic diagram showing exchanges of tag metadata stored on the server with the second user terminal shown in FIG. 5 in accordance with an embodiment.

By way of further example shown in FIGS. 5-7, USER-1 may generate metadata, such as various types of tags and tag attributes, including frame tags, scene tags, and highlight reels, and USER-2, being part of a social network including USER-1, is able to consume these tags (i.e., view the tags with the viewing of the primary video content or highlight reels thereof). The user terminals 10 and 12 each have a "User Application" 48 which may be in the form of software run when the users generate and/or consume tags. User-generated tag data can be processed by a Collaborative Media Tag Management Library (i.e., CMTM Library) module 50 which may be provided in the user terminal 10 and which may communicate with a Closed Captioning (CC) system module 52 also provided in the user terminal 10.

Thus, when USER-1 plays and views primary video content, the CMTM Library module 50 registers in step 54 for triggers from the CC system module 52 relating to the display of specific captions during the running time of the primary video content. In turn, in step 56, the CC system 54 informs the CMTM Library module 50 of triggers which can be used to associate a current timestamp during the running of the primary video content. The CC system 54 produces triggers periodically throughout the running time of the primary video content. For example, CEA-708 protocol provides information for the CC system module 54 to access CC data from a video stream and also provides commands at specific times during the running of a video to display and remove captions form the display screen. By way of example, the triggers of step 56 could correspond to when the CC system module 54 issues commands to display or "put up" a next or a given caption or "take down" a previous caption.

Accordingly, when USER-1 generates a new tag or other metadata as shown by step 58 in FIG. 6, the User Application 48 provides the tag to the CMTM Library module 50. The CMTM Library module 50 uses information of Trigger-3 (as shown in FIG. 6) and determines an offset and associates this information with the new tag. In step 60, the CMTM Library module 50 of user terminal 10 transmits the tag information to the CMTM server 14 via network connection for storage.

As shown in FIG. 7, USER-2 can use the User Application 50 loaded on user terminal 12 when USER-2 views the primary video content with the tag generated by USER-1. Regardless of the source of the primary video content or it being the same or different in comparison to the version of the primary video content viewed by USER-1, the tag generated by USER-1 can be properly displayed ("put up" and "taken down") at appropriate times during the playback of the primary video content by USER-2. Thus, in step 62, the User Application 48 of user terminal 12 informs the CMTM Library module 50 of user terminal 12 that the primary video content is to be played. In step 64, the CMTM Library module 50 of user terminal 12 transmits a request to the CMTM Server 14 to provide (i.e., "GET") the tags, such as user-generated tags, associated with the primary video content about to be played by USER-2. In turn, in step 66, the CMTM server 14 provides the requested tags and tag information needed to correlate the tags with the primary content video.

After receiving tag information for the primary content video, the CMTM Library module 50 of user terminal 12 registers with the CC system module 52 of user terminal 12 so that the CC system module 52 provides content-specific temporal markers or triggers with respect to the primary video content. See step 68. Thus, in steps 70, the CC system module 52 of user terminal 12 provides a series of triggers, for instance at the "put up" or "take down" times of sequentially displayed captions, to provide content-specific temporal markers to the CMTM Library module 50 of the user terminal 12. Accordingly, since the CMTM Library module 50 has information concerning the tag generated by USER-1 after a determined offset from "Trigger-3" within the primary video content, in step 72 the CMTM Library module 50 provides the User Application 48 of the user terminal 12 with the tag for temporary display during an appropriate segment in the running time of the primary video content.

The devices, terminals, units, modules, servers, and storage discussed above can physically be provided on a circuit board or within an electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. As stated above, the user terminals can be in the form of set-top boxes, televisions, media centers, computers, gaming consoles, laptop computers, tablet computers, smartphones and the like.

While the principles of the invention have been described above in connection with specific devices, systems, and methods, it is to be clearly understood that this description is made only by way of example and not as limitation on the scope of the invention as defined in the appended claims.

I claim:

1. A method of correlating content-specific metadata to a point of interest in primary video content of a video program, comprising the steps of:

generating a series of content-specific temporal markers spaced throughout the play time of the primary video content;

receiving input of the content-specific metadata intended for temporary display at the point of interest during playback of the primary video content;

associating the content-specific metadata and point of interest with at least one of the content-specific temporal markers; and wherein the item of content-specific metadata is metadata generated by another viewer of the primary video content via viewing of a different video program in which the primary video content is provided.

2. A method according to claim 1, wherein said associating step includes determining an offset of the point of interest from one of the series of content-specific temporal markers and associating the point of interest with the one of the series of content-specific temporal markers and the offset.

3. A method according to claim 2, further comprising the step of transmitting the content-specific metadata and information of the one of the series of content specific temporal markers and the offset that associates the content-specific metadata to the point of interest within the primary video content to a server for storage apart from the primary video content and video program.

4. A method according to claim 1, wherein said generating step includes obtaining information from a video stream providing the primary video content concerning captions provided with the primary video content and using the information concerning captions to generate the series of content-specific temporal markers.

5. A method according to claim 4, wherein the captions provided by the video stream are closed captions.

6. A method according to claim 5, wherein the information concerning captions relates to at least one of times to display closed captions during playback of the primary video content and times to remove closed captions during playback of the primary video content, and wherein at least one of the times to display closed captions and the times to remove closed captions are used as timestamps for defining the content-specific temporal markers for the primary video content.

7. A method according to claim 1, wherein said generating, receiving and associating steps are performed by an electronic user terminal device, and wherein the electronic user terminal device is a device selected from a group consisting of a set-top box, a television having an integral set-top box, a media center, a gaming console, a computer, a laptop computer, a tablet computer, and a smartphone.

8. A method according to claim 1, wherein said generating, receiving and associating steps are used to associate newly created user-generated metadata to the primary video content of another provided by a source, and wherein the user-generated metadata is metadata selected from a group consisting of tags, bookmarks, comments, ratings, frame tags, and scene tags.

9. A method of correlating content-specific metadata to a point of interest in primary video content of a video program, comprising the steps of:
generating a series of content-specific temporal markers for the primary video content of the video program received from a source;
receiving, from a remote server and apart from receiving the video program, an item of content-specific metadata and information of one of the series of content-specific temporal markers and an offset from the one of the series of content-specific temporal markers that associates the item of content-specific metadata to the point of interest within the primary video content;
controlling display of the video program on a display screen such that the item of content-specific metadata is temporarily displayed at the point of interest of the primary video content; and
wherein the item of content-specific metadata is metadata generated by another viewer of the primary video content via viewing of a different video program in which the primary video content is provided.

10. A method according to claim 9, wherein said generating step includes obtaining information concerning captions provided by a video stream for the primary video content and using the information concerning captions to generate the content-specific temporal markers.

11. A method according to claim 10, wherein the captions provided with the primary video content are closed captions.

12. A method according to claim 11, wherein the information concerning captions relates to at least one of times to display closed captions during playback of the primary video content and times to remove closed captions during playback of the primary video content, and wherein at least one of the times to display closed captions and the times to remove closed captions are used as timestamps for defining the content-specific temporal markers for the primary video content.

13. A method according to claim 9, wherein said generating, receiving and controlling steps are performed by an electronic user terminal device, and wherein the electronic user terminal device is a device selected from a group consisting of a set-top box, a television having an integral set-top box, a media center, a gaming console, a computer, a laptop computer, a tablet computer, and a smartphone.

14. A method according to claim 9, further comprising the step of obtaining the video program providing the primary video content from the source which is different from the server.

15. A method according to claim 9, wherein the item of content-specific metadata is selected from a group consisting of tags, bookmarks, comments, ratings, frame tags, and scene tags.

16. A signal processing electronic device for correlating content-specific metadata to a point of interest in primary video content of a video program, comprising:
a caption system module for generating a series of content-specific temporal markers for the primary video content based on caption information provided by a video stream providing the primary video content;
a processing unit having user application software for generating and temporarily displaying content-specific metadata relative to points of interest within the primary video content;
a collaborative media tag management library module for communicating with a remote server to access and store content-specific metadata apart from the video program and to access and store information of the points of interest associated with the content-specific metadata based on a specific one of the series of content-specific temporal markers and an offset therefrom; and
wherein the item of content-specific metadata is metadata generated by another viewer of the primary video content via viewing of a different video program in which the primary video content is provided.

17. A signal processing electronic device according to claim 16, wherein the signal processing electronic device is selected from a group consisting of a set-top box, a television having an integral set-top box, a media center, a gaming console, a computer, a laptop computer, a tablet computer, and a smartphone.

18. A signal processing electronic device according to claim 16, wherein the information concerning captions relates to at least one of times to display closed captions during playback of the primary video content and times to remove closed captions during playback of the primary video content, and wherein at least one of the times to display closed captions and the times to remove closed captions are used as timestamps for defining the content-specific temporal markers for the primary video content.

19. A signal processing device according to claim 16, wherein the item of content-specific metadata is user-generated metadata concerning the primary video content, and wherein the user-generated metadata is metadata selected from a group consisting of tags, bookmarks, comments, ratings, frame tags, and scene tags.

* * * * *